Nov. 21, 1967  H. R. NEWELL  3,354,392
CATHODE RAY VOLTMETER USING SWEEP SIGNAL FOR SCALE
GENERATION AND FOR INPUT SIGNAL LEVEL COMPARISON
Filed Sept. 2, 1964  2 Sheets-Sheet 1
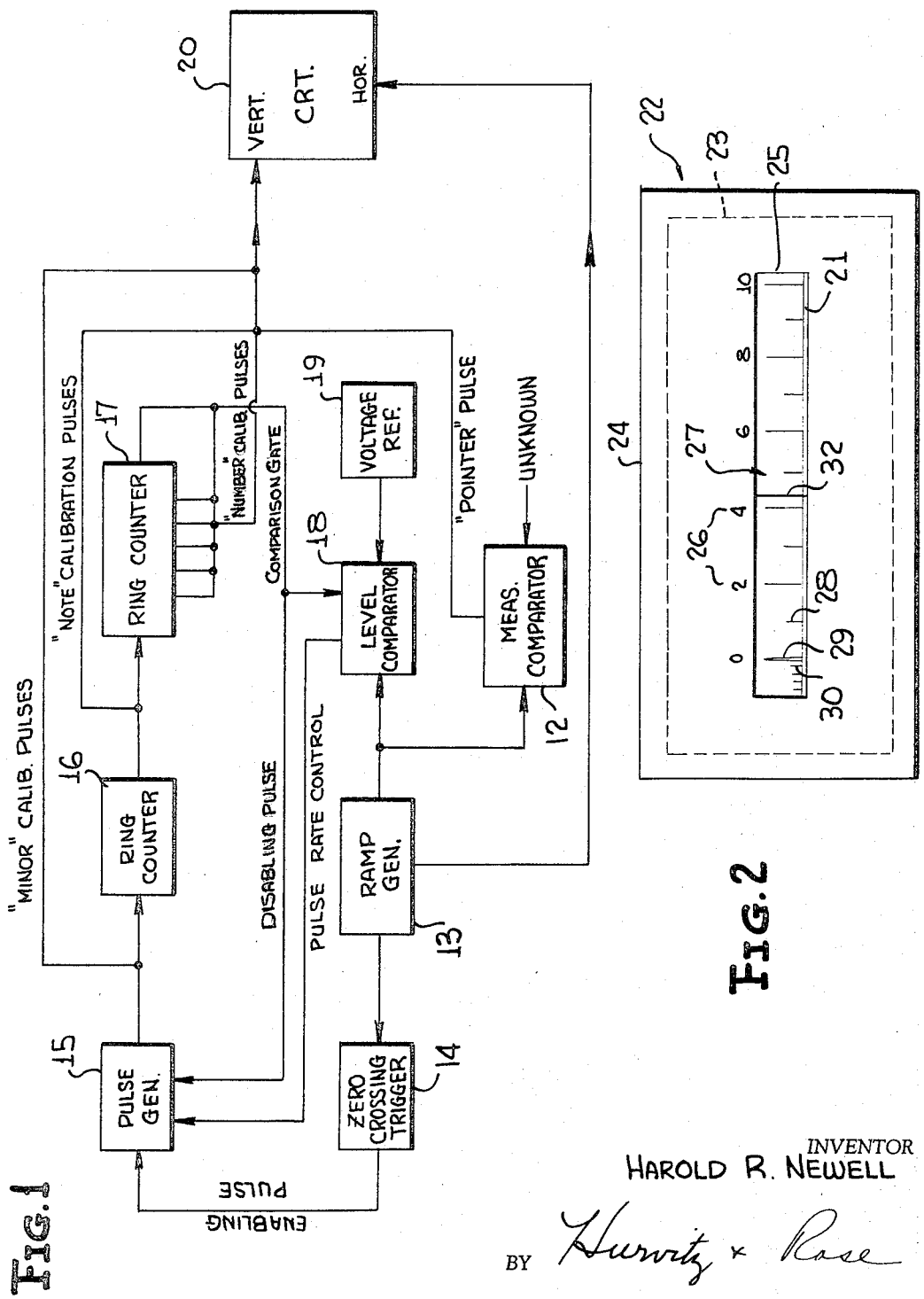
INVENTOR
HAROLD R. NEWELL
BY Hurvitz & Rose
ATTORNEYS Nov. 21, 1967    H. R. NEWELL    3,354,392
CATHODE RAY VOLTMETER USING SWEEP SIGNAL FOR SCALE
GENERATION AND FOR INPUT SIGNAL LEVEL COMPARISON
Filed Sept. 2, 1964      2 Sheets-Sheet 2
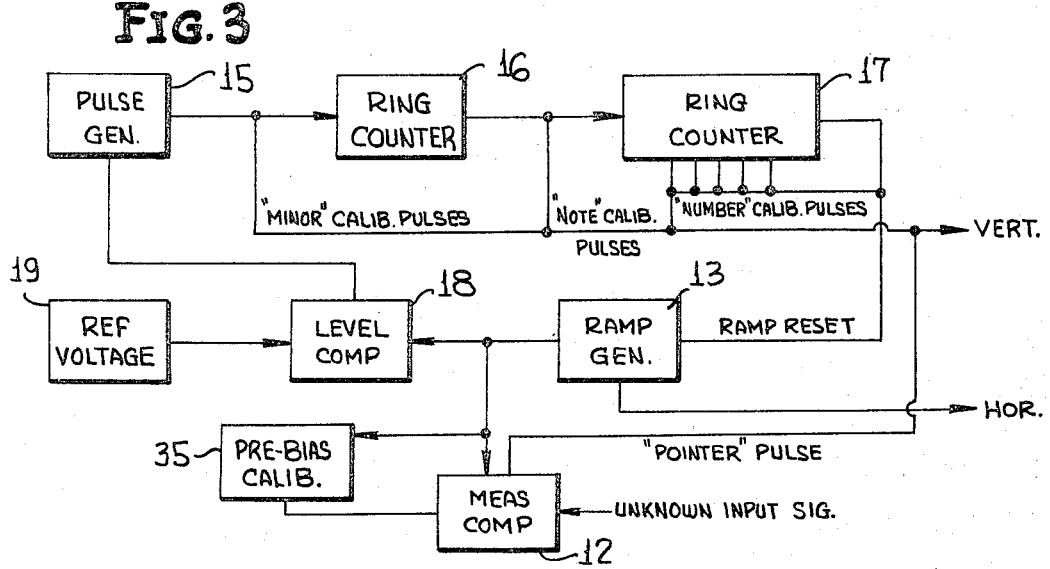
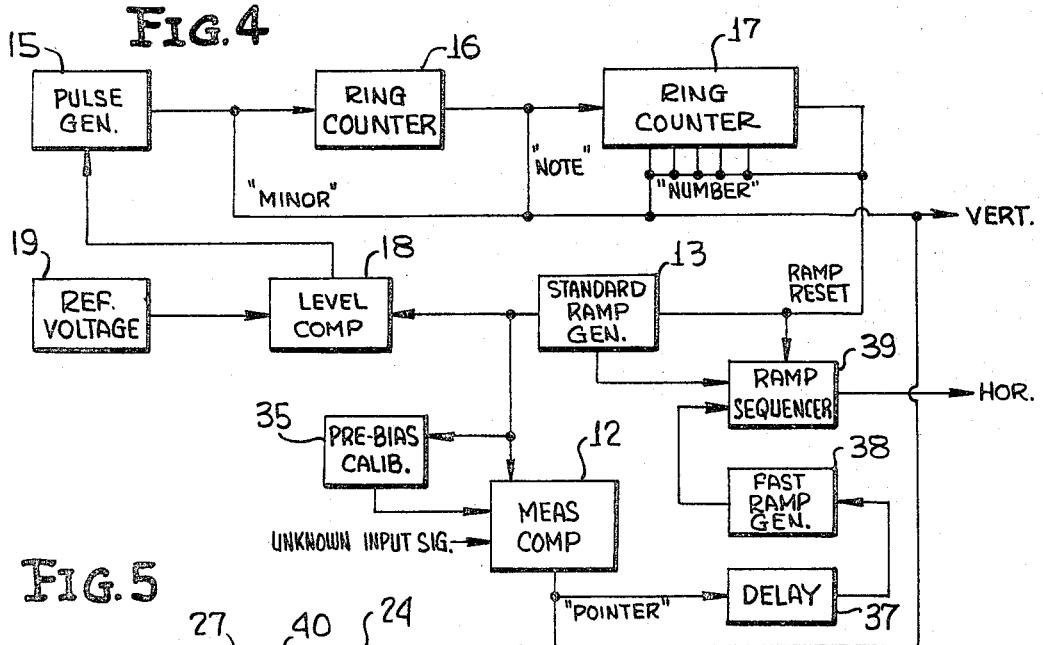
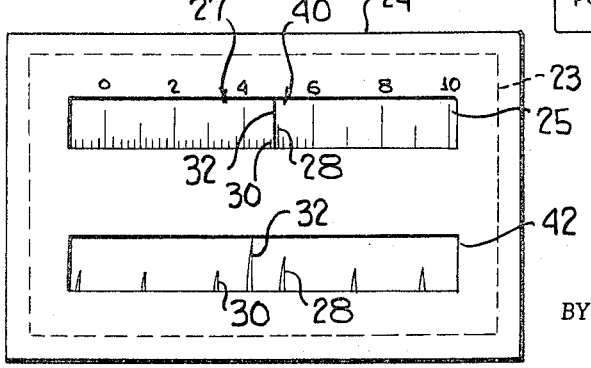
INVENTOR
HAROLD R. NEWELL
BY *Hurvitz & Rose*
ATTORNEYS United States Patent Office 3,354,392
Patented Nov. 21, 1967

3,354,392
CATHODE RAY VOLTMETER USING SWEEP SIGNAL FOR SCALE GENERATION AND FOR INPUT SIGNAL LEVEL COMPARISON
Harold R. Newell, South Newbury, N.H., assignor to Mesur-Matic Electronics Corporation, Warner, N.H., a corporation of Delaware
Filed Sept. 2, 1964, Ser. No. 393,908
16 Claims. (Cl. 324—121)

ABSTRACT OF THE DISCLOSURE

A device for accurately measuring signal level comprising a sweep generator providing a monotonically varying signal for horizontal deflection of the cathode ray electron beam, a calibration pulse generator for providing a train of pulse for vertically deflecting the beam, the spacing between the pulses being calibrated to correspond to level variations in the sweep signal, and a comparator for generating a marker pulse to vertically deflect the electron beam whenever the input signal level is equal to the level of the sweep signal. The position of the marker pulse relative to the calibration pulses on the cathode ray tube display is a direct indication of the input signal level.

---

The present invention relates to electronic measuring devices and more particularly to improved electronic measuring devices for providing analog presentation of the signal parameters sought to be measured.

In accordance with the present invention an analog presentation is provided in the form of a scale having calibrated indicia thereon on the face or screen of a cathode ray tube upon which the instantaneous magnitude of the desired parameter is displayed. A ramp voltage generator provides an output to be translated to a series of calibration pulses, in accordance with an arbitrarily selected reference voltage, which are fed to the vertical axis of the cathode ray tube display. In addition, the ramp produces a deflection of the cathode ray tube electron beam horizontally across the screen of the tube, thus forming a base line for display calibrations. The ramp voltage is compared with the unknown voltage under observation, and upon attaining equality therewith transmits a pointer pulse to the vertical axis of the display to indicate the instantaneous magnitude of the unknown voltage.

Known prior art measuring devices utilizing cathode ray tubes as measuring devices have been unable to provide an instantaneous representation of the magnitude of the desired parameter in the form conveniently similar to that of an ordinary scale meter, without extensive modification of the cathode ray tube itself. For example, in one known form of analog display a solid member having indicia apertures therein is interposed between the electron gun and screen of the cathode ray tube. A relatively elaborate electronic circuit including a plurality of level-setting gates is used to provide the desired deflection of the electron beam through the indicia apertures. This device suffers from complexity in addition to the need for relatively specialized components including the modified cathode ray tube itself to provide the desired display. Another form of electronic measuring apparatus utilizing a cathode ray tube employs a comparison network to deflect the electron beam toward a position on the CRT screen to enable detection by a light sensitive device which provides an input to an electronic counter. There is thus no immediate representation of the magnitude of the unknown signal on the face of the tube itself. Instead, the counter is required as a separate measuring device to provide the desired measurement. Neither of these prior art devices combines simplicity and accuracy in measuring apparatus producing an entirely electronic display on the screen of a CRT as an indication of the value of an unknown parameter.

It is therefore a broad object of the present invention to provide an improved electronic measuring device.

It is another broad object of the present invention to provide an electronic measuring device having an improved analog form of presentation.

It is a further object of the present invention to provide electronic measuring apparatus wherein the value of the unknown parameter is indicated by a completely electronic scale presentation on the screen of a cathode ray tube.

It is a still further object of the present invention to provide a calibrated scale on the face of a cathode ray tube in the form of an electron beam pulse index extending from a base line across which a pointer pulse is deflected to indicate the value of the unknown quantity under observation.

Other objects, features and attendant advantages of the present invention will become apparent from a consideration of the following detailed description of specific embodiments thereof taken in conjunction with the accompanying drawings, in which:

FIGURE 1 is a block diagram of one embodiment of the present invention;

FIGURE 2 is a front view of the screen of the cathode ray tube illustrating the scale provided by the system of FIGURE 1;

FIGURE 3 is an alternative embodiment of the system of FIGURE 1;

FIGURE 4 is a modification of the system of FIGURE 3; and

FIGURE 5 is a front view of the CRT illustrating an expanded scale presentation provided by the system of FIGURE 4.

Referring now to FIGURE 1, a block diagram of a system in accordance with the present invention is illustrated as comprising a measurement comparator 12, to which an unknown signal is applied. A ramp generator 13 supplies a second input to comparator 12. The ramp generator output is also applied to a zero crossing trigger or crossover network 14, to a level comparator 18, and to the horizontal axis of a CRT 20. Crossover network 14 is coupled to a pulse generator 15, which in turn provides an input to a pair of ring counters 16, 17, and to the vertical axis of the display. The ring counter outputs are also fed to the vertical axis of CRT 20. In addition, the output of ring counter 17 is coupled to level comparator 18 and to the pulse generator 15. The output of a voltage reference source 19 is applied to level comparator 18 and the output of the latter is coupled to pulse generator 15. Measurement comparator 12 is further coupled to the vertical axis of the display. The cathode ray tube with its associated apparatus is illustrated symbolically at 20.

In operation, referring to FIGURES 1 and 2, the unknown signal, for example a voltage, is applied to measurement comparator 12. Ramp generator 13 provides a linearly rising voltage which forms the basis for the measurement. It is to be understood that although in the following description the output of generator 13 is referred to as a ramp or a linearly rising voltage, any monotonic function of time may be used as the basis for the display and to provide the desired indication. For example, logarithmic or exponential voltages may be employed to provide related scales. The output of generator 13 is applied to the horizontal axis of cathode ray tube 20 to deflect the electron beam across the screen and thus to provide a base line for the display. The repetition rate of the ramp may be selected to produce a display with no noticeable flicker and the ramp amplitude may be preselected to deflect the beam over the entire width of the screen. The output of ramp generator 13 is also applied to zero crossing trigger or crossover network 14 which transmits an enabling pulse to pulse generator 15 when the ramp voltage is equal to a predetermined low reference level to which the crossover network has been adjusted. Ordinarily the low reference level will be zero volts, but it may alternatively be set at some greater value if desired. Pulse generator 15 has an output pulse repetition frequency (PRF) which is nominally adjusted to provide a desired number of calibration pulses before the ramp attains its maximum voltage level. When the ramp voltage attains a level equal to that to which crossover network 14 has been adjusted, the latter produces an enabling pulse which triggers generator 15. The calibration pulses from the pulse generator are applied to the vertical axis of CRT 20 to deflect the beam as illustrated by pips 30 on the screen of FIGURE 2, in the form a a set of "minor" calibration pulses. Pips 30 thus rise from the base line 21 produced by the application of the ramp voltage to the CRT horizontal plates. Each time a predetermined number of pulses have been generated by pulse generator 15, in response to an enabling pulse from network 14, ring counters 16 and 17 are driven to supply an output pulse to the vertical deflection plates of the CRT. Referring again to FIGURE 2, counters 16 and 17 produce "note" and "number" pulses in the form of pips 28 and 29 respectively upon receipt of the predetermined count of "minor" calibration pulses.

Each output pulse from ring counter 17 is also applied to level comparator 18 to gate a comparison between the instantaneous level of the ramp voltage and the level of a reference voltage supplied by source 19. Comparison of the ramp and reference voltages determines whether the voltage level represented by the calibration pulses displayed on the CRT screen has been attained. If it has not, level comparator 18 produces a pulse rate control signal for readjustment of calibration pulse generator 15 to permit the ramp supplied by generator 13 to reach a higher voltage prior to initiation of the next output pulse from counter 17. That is, comparator 18 controls the PRF of pulse generator 15 in accordance with the desired ramp voltage level and thus the output pulse from counter 17 for continuously accurate calibration of the scale indicated generally at 27 of FIGURE 2. Should the voltage level of the ramp exceed the level of the voltage reference upon gating of a comparison, level comparator 18 provides a signal to increase the PRF of generator 15. In this manner the quantity represented by a given number of calibration pulses is caused to remain constant. The output pulse from ring counter 17, which is used to gate the comparison of the levels of the ramp and references voltages, is also applied to pulse generator 15 to disable the latter until the ramp voltage begins another cycle and again rises to the low reference voltage level of crossover network 14.

A typical display provided by the calibration pulses and ramp voltage is illustrated generally at 22 of FIGURE 2. A mask 24 is placed over the front of the screen of the CRT outlined at 23. The mask is provided with a window 25 for purposes of display of the scale and indication of magnitude of the unknown quantity. Calibration pulses which are supplied to the vertical axis of CRT 20 produce the scale index which in the embodiment of FIGURES 1 and 2 is illustrated as consisting of 50 divisions. Of course the number of divisions is adjustable as desired. The outputs of the ring counters provide accentuation of certain calibration pips to provide note and number divisions 28 and 29 respectively. Base line 21 is produced by the output of ramp generator 13 which is applied to the horizontal deflection plates of the CRT. The mask 24 may be provided with a series of numerals which are inscribed or otherwise suitably placed thereon in accordance with the predetermined calibration of the scale 27. A plurality of masks may be conveniently and suitably marked for use in conjunction with various calibrations of the scale. Continuing with circuit operation, the ramp voltage from generator 13 is applied to measurement comparator 12 to which is also applied the unknown voltage desired to be measured. These two inputs are compared and when the ramp voltage level becomes equal to the unknown voltage a pointer pulse is initiated by the measurement comparator 12 and applied to the vertical axis along with the calibration pulses. The pointer pulse will thus appear on the typical display 27 as a marker 32 at a position along the base line 21 relative to the calibration pulses to indicate the unknown voltage value.

The present invention thus provides a complete, substantially instantaneous, and easily read display for purposes of measuring steady or varying unknown signals applied thereto. Advantageously, the display has a form conveniently similar to the scale and pointer of the ordinary moving coil meter, but operation is obtained without the disadvantages of moving mechanical components. The length of the scale may be varied at will, as may the number and type of calibrations, by appropriate adjustments within the exemplary system of FIGURE 1.

An alternative embodiment of the present invention is illustrated in FIGURE 3. In contrast to the arrangement shown in FIGURE 1, the system of FIGURE 3 provides a controllable ramp rather than a fixed ramp. The interconnection of the various elements of FIGURE 3 is similar to that previously described and illustrated in connection with FIGURE 1, except that the need for the enabling pulses and disabling pulses to key or trigger operation and non-operation of pulse generator 15 is dispensed with. Consequently, crossover network 14 and direct interconnection of counter 17 output with generator 15 are no longer present. A pre-bias calibration network 35 is coupled to the output of ramp generator 13 and provides an input to measurement comparator 12. In this embodiment pulse generator 15 is arranged to generate a continuous output, i.e. to produce a train of output pulses. The output pulses drive ring counters 16 and 17 as previously described, the latter counter again producing an output pulse when the count of calibration pulses has reached the required number. Here, however, the counter pulse resets the ramp generated by ramp generator 13 and inhibits its restart for a given number of "minor" pulse periods. When the ramp is again allowed to rise, a zero pulse representing the zero reference pip on the CRT screen scale triggers prebias calibrator 35 to bias measurement comparator 12 in accordance with the zero calibration level of the ramp. The peak level attained by the ramp voltage is compared with the fixed reference voltage level from source 19 in level comparator 18. The difference voltage is applied to pulse generator 15 in the form of a feedback correction or error voltage to permit automatic adjustment of the ramp voltage to the desired level before being reset by the output pulse from counter 17. Thus, in this alternative arrangement the ramp voltage level is controlled rather than the number of calibration pulses generated by pulse generator 15. The ramp is again applied to measurement comparator 12 where a comparison is effected between the ramp and the unknown input voltage. Since comparator 12 has been prebiased in accordance with the ramp level at the occurrence of the zero pulse, only the difference in ramp voltage levels between the zero calibration point and the reset pulse calibration point is taken into account in the measurement of the unknown signal voltage. A pointer pulse is initiated by comparator 12 when the ramp voltage level is equal to the level of the unknown signal voltage and is applied to the vertical axis of the CRT to appear on the display as an instantaneous measurement of signal level.

It is to be understood that particular elements have been shown and described in the embodiments of FIGURES 1 and 3 for illustrative purposes only. Various alternative elements are available. For example, ring counters 16 and 17 may be replaced by any form of pulse generators which are capable of being triggered to provide the calibrated indicia on the scale of the display. In general, then, the present invention includes precisely timed and accurately controlled pulse circuits which provide the calibrated divisions of the display and produce accentuation of certain of these divisions, a generator providing a monotonically varying signal for horizontal deflection of the electron beam and comparison with the input signal, and a coincidence circuit or comparator for generating a pointer pulse in the display when the ramp magnitude is equal to the input signal level to thus indicate the magnitude of the unknown signal. A direct indication of the unknown signal level is therefore provided without the need for mechanical moving parts and without requirement of additional measuring apparatus or special components incorporated into the CRT itself. The present invention provides an accurate analog conversion and presentation of the unknown signal levels.

The display scale may be expanded in the region of the pointer by the exemplary circuit of FIGURE 4 which illustrates a modification of the embodiment of FIGURE 3. Operation of the circuit is similar to that described with respect to FIGURE 3 except as follows:

An expansion or magnification factor is selected prior to calibration of delay circuit 37, fast ramp generator 38, and ramp sequencer 39. Assume, for example, that it is desired to lengthen scale 27 in the portion indicated at 40 (FIGURE 5), at which pointer 32 appears, by a factor of 10. Delay circuit 37 is started upon receiving a pointer pulse from measurement comparator 12 during the first scan. The delay circuit is timed so as to reset and produce a pulse when, for example, 95 percent of the next full scale scan cycle duration has occurred, this output pulse being applied to fast ramp generator 38 to trigger the latter. The fast ramp generator may be adjusted to provide a ramp of, say, 1/10 the duration of the standard ramp, i.e. the ramp generated by standard ramp generator 13. By virtue of this operation the next pointer pulse will appear at the center of the display swept by the fast ramp. That is, the fast ramp is generated or started at 1/20 the duration of the standard ramp prior to passage of the pointer pulse and is completed 1/20 the duration of the standard ramp following passage of the pointer pulse. Sequencer circuit 39 is arranged to apply the outputs of standard ramp generator 13 and fast ramp generator 39 to the CRT to sweep the horizontal axis on alternate ramp cycles.

Referring to FIGURE 5, the normal scale and expanded scale are displayed sequentially on the CRT screen in windows 25 and 42, respectively, by virtue of the operation of the circuit of FIGURE 4. Normal scale 27 is produced by the operation of that portion of the circuit corresponding to the embodiment of FIGURE 3, while the expanded scale is provided by elements 37 and 38 cooperating therewith. Sequential sweeping of the horizontal axis by ramp sequencer 39 permits the substantially simultaneous display of both scales, CRT flicker and image retention being adjustable in a conventional manner to aid in effecting the apparent simultaneous presentation. In the expanded scale, pulses 28, 30, and 32 correspond respectively to the pips produced in the normal scale by "minor" and "note" calibration pulses and by the pointer or indicator pulse.

The normal scale may, if desired, be brightened in that portion represented by the expanded scale to clearly indicate the region under magnification. While preferred embodiments have been described, it will be apparent that various changes and modifications may be effected without departing from the true spirit and scope of the present invention. It is thus desired that the invention be limited only by the appended claims.

I claim.

1. A measuring device comprising means for generating a repetitive monotonically increasing signal waveform having a fixed maximum amplitude, means for generating a series of calibration pulses in response to the attainment of a predetermined reference level by said waveform, means for maintaining the number of said generated calibration pulses constant over a time interval between attainment by said waveform of said reference level and said fixed maximum amplitude, a cathode ray tube having an electron beam generator, a horizontal sweep circuit and vertical deflection means, means for comparing the level of said waveform with the level of an unknown signal and for generating an indicating pulse when said levels are equal, means for applying said calibration and indicating pulses to said vertical deflection means, and means for applying said waveform to said horizontal sweep circuit, said pulses and said waveform producing deflection of the electron beam of said CRT to provide a scale and indicator on the screen of said tube.

2. The combination according to claim 1 wherein said means for applying said waveform to said horizontal sweep circuit includes means for expanding said scale to provide a magnified scale portion about said indicator.

3. The combination according to claim 2 wherein said scale expanding means includes means for generating a further repetitive monotonically increasing waveform having a preselected period less than said time interval, delay means responsive to said indicating pulse for triggering said further waveform generating means prior to the generation of the next successive indicating pulse, the elapsed time between said triggering and said next successive pulse being less than said period of said further waveform, and means for sequentially applying said first-named and said further waveforms to said horizontal sweep circuit.

4. The combination according to claim 1 wherein said means for maintaining constant said number of calibration pulses generated during said time interval includes a reference signal source, and means for comparing like parameter levels of said reference signal and said waveform and for applying an error signal to said calibration pulse generating means to control the frequency of said calibration pulses in accordance with the difference between said parameter levels.

5. The combination according to claim 4 wherein said calibration pulse generating means includes means for producing a gating signal in response to the generation of a predetermined number of calibration pulses to trigger a comparison between said waveform and reference signal parameter levels.

6. Electronic measuring apparatus for indicating the magnitude of an input signal comprising means for generating a periodic reference signal having a uniformly increasing level with respect to time,
   means for generating a predetermined number of pulses in accordance with the period of said reference signal,
   a cathode ray tube having electron beam producing means, and having a pair of beam deflection means,
   means for applying said pulses to one of said deflection means,
   means for applying said reference signal to the other of said deflection means,
   means for producing an indication signal upon attainment of a predetermined proportionality in level between said reference signal and said input signal, and
   means for applying said indication signal to said one of said deflection means to provide an indication of the magnitude of said signal on a calibrated scale produced by deflection of said beam in accordance with said pulses and with said reference signal.

7. The combination according to claim 6 wherein said means for applying said reference signal to the other of said deflection means includes means for expanding the length of said scale.

8. The combination according to claim 7 wherein said scale expanding means includes means for generating a further periodic reference signal having a period smaller than the period of said first-named reference signal, means responsive to said indication signal for actuating said further reference signal generating means at a predetermined time, less than said smaller period, prior to initiation of the next successive indication signal, and means for sequentially applying said first-named and said further reference signals to the other of said deflection means.

9. A device for measuring the magnitude of an unknown signal voltage comprising means for generating a periodic waveform having a monotonically increasing voltage level with respect to time;
  means for generating a perdetermined number of periodic pulses during the period of said waveform in response to the attainment of a predetermined reference voltage level by said waveform,
  a cathode ray tube having beam producing means, a screen, a horizontal sweep circuit, and vertical deflection means,
  means for applying said waveform to said horizontal sweep circuit,
  means for comparing the voltage level of said waveform with the voltage level of said input signal and for initiating a reference pulse upon the attainment of a predetermined proportionality between said levels,
  means for applying said periodic and reference pulses to said vertical deflection means, said calibration pulses and said waveform producing vertical and horizontal deflection of said beam to establish a calibrated scale on the screen of said tube, and said reference pulse providing an indication of the magnitude of said unknown voltage on said scale.

10. The combination according to claim 9 wherein said device includes a comparison voltage source, means for comparing the magnitudes of said waveform and said comparison voltages, said comparison means controlling the frequency of said periodic pulses in accordance with the relative magnitudes of waveform and comparison voltages, said periodic pulse generating means including means for producing a gating signal to gate said comparison of said voltages, and means for applying said gating signal to said pulse generating means for deactuation thereof during said comparison.

11. The combination according to claim 9 wherein said device includes means for expanding said scale to provide a magnified replica of said magnitude indication, said expansion means responsive to said reference pulse to generate a further periodic waveform having a period differing from that of said first named waveform, and means for applying said further waveform to said horizontal sweep circuit in sequence with said application thereto of said first-named waveform.

12. Apparatus for the measurement of an input signal voltage comprising means for generating a monotonically increasing periodic waveform,
  means for generating a train of calibration pulses,
  means for controlling the period of said waveform in accordance with the generation of a predetermined number of said pulses;
  means for comparing the magnitudes of said input voltage and said waveform,
  means for calibrating said comparison means to establish a datum level in response to the attainment of a predetermined reference level by said waveform, said comparison means initiating an indicating pulse when said waveform voltage level equals said input voltage level,
  a cathode ray tube having electron beam producing means, and horizontal and vertical beam deflection means;
  means for applying said calibration pulses and said indication pulse to one of said deflection means,
  means for applying said waveform to the other of said deflection means, said pulses and said waveform deflecting said beam to produce a display on the face of said tube, said indication pulse providing a deflection of said beam along said display for indicating the magnitude of said input voltage.

13. The combination according to claim 12 wherein said means for applying said waveform to the other of said deflection means includes means for sequentially interrupting said waveform, means for controllably generating a further periodic waveform having a short period relative to said first named waveform, means responsive to said indication pulse for actuating said further waveform generating means subsequent to a fixed delay period less than the period of said first named waveform, said interrupting means applying said further waveform to said other deflection means during interruption of said first-named waveform.

14. In a device for measuring the amplitude of an applied signal parameter, said device having a cathode ray tube with beam producing and deflection means, the combination of means for generating a periodic monotonically varying signal, means operable upon attainment of a reference amplitude by said periodic signal for generating a datum signal, means coupled to said CRT deflection means and responsive to said datum signal for generating a train of pulses having a variable repetition frequency, a comparison signal, actuable means for comparing the amplitudes of said periodic signal and said comparison signal and for controlling said repetition frequency in accordance with the instantaneous difference therebetween, means responsive to the generation of a predetermined number of said pulses for actuating said comparison means, and further means for comparing the amplitudes of said periodic signal and said applied signal and for applying a marker pulse to said deflection means upon attainment of a predetermined proportionality therebetween.

15. In an analog signal level measuring device for providing an output display on the screen of a cathode ray tube, said tube having electron beam generator and beam deflection means, the combination comprising means for receiving an input signal, first circuit means coupled to said deflection means for sweeping said beam across said screen at a preselected repetition rate to provide a base line thereon, second circuit means coupled to said deflection means for pulsatingly deflecting said beam in a calibration pattern along said base line, and third circuit means coupled to said signal receiving means and to said beam deflection means for producing a marker deflection of said beam, said marker deflection providing an indication of the magnitude of said input signal relative to said calibration pattern along said base line.

16. Apparatus for indicating the level of an input signal on a display screen illuminated by the deflection of an electron beam comprising sweep circuit means for deflecting said beam along said screen to provide a scale base line, calibration signal means for repetitively deflecting said beam at preselected points along said scale base line to provide scale indicia and means for comparing the levels of said calibration signal and said input signal to produce a deflection of said beam along said base line at a point at which the levels of said signals are equal.

References Cited
UNITED STATES PATENTS
2,121,359  6/1938  Luck et al. _____ 324—121

OTHER REFERENCES
Weinberg, R. C.: "Modified Ramp Generator Develops High D-C Input Impedance," Electronics, Feb. 21, 1964, pp. 33, 34 and 35.

RUDOLPH V. ROLINEC, *Primary Examiner.*

WALTER L. CARLSON, *Examiner.*

E. F. KARLSEN, *Assistant Examiner.*